Patented Jan. 5, 1954

2,665,317

UNITED STATES PATENT OFFICE 2,665,317

METHOD OF TREATING RUBBER OBTAINED FROM RUBBER-BEARING PLANTS

Frederick E. Clark and Irvin C. Feustel, Salinas, Calif., assignors to the United States of America as represented by the Secretary of Agriculture No Drawing. Application November 14, 1951, Serial No. 256,356

4 Claims. (Cl. 260—818)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a method for treating natural rubber extracted from various shrubs, vines, and other plants for the purpose of preventing clumping or cohesion of rubber particles during handling and processing. The method is specifically applicable to rubber obtained from the guayule shrub (*Parthenium argentatum*, Gray), one of the most promising sources of natural rubber that can be grown in the United States, in which connection it will be described in detail.

In the recovery of rubber from guayule by the conventional mechanical extraction process, the harvested shrub is first defoliated, comminuted, and crushed. This material is then milled in a water slurry with pebbles in a pebble mill until the rubber is completely released from plant cells and agglomerated into macroscopic particles or granules commonly called "worms." The pebble-milled slurry is then discharged into a flotation tank wherein additional water is added and the mixture thoroughly stirred to facilitate separation of the worms from the plate material (bagasse). After standing for a short period, the rubber worms float to the surface of the water while the bagasse sinks. The worms are recovered by skimming the flotation tank. The worms are then given a hydrostatic pressure treatment in hot water at 500 p. s. i. or greater, to waterlog cork fragments which floated with the rubber in the first flotation. After this pressure treatment the worms are given a second flotation similar to the first. The waterlogged cork fragments now sink and the worms are again skimmed from the flotation tank. The worms are next subjected to a scrubmilling treatment. This constitutes pebble milling of a slurry of the worms in hot water, followed by a third flotation for final purification from adhering or imbedded plant fibers. The quantity of water used for scrub milling is usually about 20 parts to 1 of rubber (dry basis). The ratio of water to rubber in the flotation tank is about 100 to 1. The worms skimmed from the third flotation are usually spread out on trays and dried in a vacuum drier.

The resulting product is the crude resinous guayule rubber of commerce. It contains an average of about 20–25% resin (acetone or alcohol soluble constituents). This gross impurity limits the usefulness of guayule rubber and for this reason efforts are being made to develop a deresination process by means of which a crude rubber of superior quality can ultimately be produced.

The wet rubber worms as recovered from the scrub milling operations are roughly comparable in size to grains of rice and they possess a micro sponge-like structure. At this point in the process the worms are regarded as being generally best suited for deresination by solvent extraction because of their favorable size, granular condition, and pervious structure. Hence, efforts are being made to develop a deresination process based on the use of wet scrub-milled worms. At times, however, the worms clump or cohere to form relatively large and impervious aggregates or masses which cannot be extracted because the resin solvent will not penetrate the lumps that have been formed. Clumping may take place to varying degrees at any stage in the pebble milling process although operational difficulties due to clumping have principally been focused on the scrub milling step since this is the most critical one from the standpoint of applying corrective treatments for worms already clumped and for attaining a well dispersed or non-cohering condition in which the worms are suitable for drying or for resin extraction.

It is frequently very difficult and at times impossible to break up all the clumps or to prevent further clumping in the scrub mill. Sometimes the lumps or aggregates of worms become so large as to weigh several pounds. Clumped rubber is not only impossible to deresinate effectively but is also unsuitable for drying because the normal-sized worms in the mixture become over-dried and degraded by the prolonged heating necessary to dry the lumps.

It is necessary to keep the worms submerged in water if there is a break in processing continuity or a delay in transport from one processing step to another in order to minimize clumping and also to protect the rubber from exposure to air since it is very susceptible to oxidation unless an antioxidant has been applied. However, if worms are held in a container for more than a few hours a closely cohering mass of rubber is usually formed which requires considerable effort to break up into individual worms. Steam treatment is often resorted to in such cases but at best this has only a temporary beneficial effect.

The rubber possesses some tackiness and consequently there is a natural tendency for a mass of worms to cohere especially under conditions where the pressure resulting from its own weight becomes appreciable and the period of contact is prolonged.

In some cases a high degree of clumping is caused by a rapid cooling of the water or other liquid in which the worms are being processed or contained. In other cases clumping is associated with certain physiological influences of the shrub from which the rubber is milled since the difficulties are more pronounced during the shrub flowering season. Also, rubber milled from young shrub has a greater tendency to clump than rubber from old shrub.

The object of this invention is to treat the worms in such a manner as to prevent clumping or cohesion of the individual worms. A further object is to provide a treatment which will retain its effectviveness not only with regard to handling of the worms prior to deresination but also during deresination and/or in preparation of the rubber for drying.

We have found that the above objects can be attained by coating the worms with a thin film of a water-insoluble metallic soap, that is, a water-insoluble salt of a metal and a higher fatty acid. The insoluble soap film prevents the worms from clumping during handling or processing of the worms as in the various milling, flotation, and hydrostatic pressure operations. Moreover, the insoluble soap-coated worms will not clump even if held en masse for a prolonged period of time. Furthermore, the film does not prevent moisture vapor from passing off readily during drying nor does it prevent penetration of a solvent such as acetone during deresination. Still further, the insoluble soap film does not have any adverse effect on the quality of the rubber.

The insoluble soap may be derived from many different materials. Thus, the metal moiety of the insoluble soap may be any metal which forms an insoluble soap, as for example, zinc, cadmium, aluminum, magnesium, lead, calcium, strontium, barium, tin, mercury, and so forth. Metals such as copper, manganese, and iron are operative but their use is not advised because these metals may catalyze oxidation of the rubber.

The fatty acid moiety of the insoluble soap may be any of the higher fatty acids as for example, capric, lauric, myristic, palmitic, margaric, stearic, arachidic, oleic, and so forth. Mixtures of fatty acids derived from natural sources such as coconut oil, tallow, lard, soybean oil, peanut oil, cottonseed oil, and so forth are effective and economical.

The insoluble soap coating may be applied in several different ways. Our preferred method is to directly apply the insoluble metallic soap to the rubber worms. To this end, an insoluble soap such as zinc stearate is made up into an aqueous dispersion with the aid of a dispersing agent. The worms are then treated with this aqueous dispersion in such manner as to achieve good contact between the entire surface of the worms and the dispersion, thus for example the worms may be agitated in a bath of the aqueous dispersion. As the dispersing agent we may employ any of the materials known to have the ability to disperse insoluble materials in aqueous media. Thus for example one may use polyoxyethylene sorbitan monolaurate; polyoxyethylene lauryl alcohol; dialkyl esters of sulphosuccinic acid such as dihexyl sodium sulphosuccinate, dioctyl sodium sulphosuccinate; the sodium salt of dehydrogenated rosin; sulphated higher alcohols such as sodium dodecyl sulphate, sodium tetradecyl sulphate, sodium hexadecyl sulphate; alkylated aromatic sulphonates such as sodium decyl benzene sulphonate, sodium dodecyl benzene sulphonate, sodium tri(isobutyl) benzene sulphonate, sodium alkylated ($C_{12}$ to $C_{18}$) benzene sulphonate, etc. The insoluble soap in the dispersion may of course be derived from any of the metals and fatty acids, or mixtures, referred to above.

Instead of applying the pre-formed insoluble soap to the rubber particles, the insoluble soap may be formed in situ on the rubber particles or in the coating bath by interaction of (1) a higher fatty acid or water-soluble salt thereof with (2) a salt of a metal which forms water-insoluble soaps. Thus specific methods of forming the insoluble soap coating on the rubber particles are as follows—

(a) Interaction of a higher fatty acid such as stearic acid with a water-soluble salt of a metal which forms water-insoluble soaps, as for example, calcium chloride, zinc chloride, or other water-soluble salts of the metals previously referred to.

(b) In the above technique (a), the fatty acid may be replaced by a water-soluble salt thereof such as an alkali metal salt. Thus one could use for example sodium stearate or an ordinary soap which consists of the sodium salts of a mixture of higher fatty acids.

(c) Interaction of a higher fatty acid such as stearic acid with the metallic ions such as calcium and/or magnesium contained in hard water in which the rubber is processed.

(d) In the above technique (c), the fatty acid is replaced by a water-soluble fatty acid salt such as sodium stearate or ordinary soap.

In applying the procedures outlined above the rubber worms may be first contacted with a solution or dispersion of the fatty acid (or water-soluble salt of a fatty acid) and then contacted with a solution of the insoluble soap-forming metal salt (or hard water). Obviously, if desired, this sequence of operations can be reversed. In these manners of operation it is evident that the insoluble soap film will be formed in situ on the surface of the rubber worms. Another method of applying our technique is to add both the fatty acid (or water soluble salt thereof) plus the insoluble soap-forming metal salt to an aqueous bath and then immerse the worms in this bath. In such type of operation the insoluble soap will be formed in the bath in minute particles which will be adsorbed on the porous surface of the worms. It is obvious that if hard water is used, no metal salt need be added. To assist in dispersing the minute particles of insoluble soap throughout the coating bath, any of the previously mentioned dispersing agents may be used.

For convenience, the insoluble soap coating may be deposited on the rubber particles during one of the aqueous milling procedures in which the worms are formed or refined. Thus preferably, the insoluble soap film is deposited on the worms in conjunction with the scrub milling operation. A typical procedure is to add stearic acid (or sodium stearate or ordinary water-soluble soap) to the water to be used in the scrub mill in an amount corresponding to about 1% of the dry weight of the rubber worms to be processed. The water is heated with steam to about 90° C. and the volume adjusted so that when the worms are introduced the ratio of the weight of water to that of dry rubber will be about 20:1 as normally used in scrub milling. The charge of rubber worms, also previously heated with steam and stirred to disperse it as thoroughly as possible, is dumped into the scrub mill containing the stearic acid-hot water mixture and milling action started. The mill is operated for about thirty minutes, after which the charge is dumped into a flotation tank and the worms recovered by skimming in the usual manner. In this illustration the water used was hard water containing sufficient calcium and magnesium to react with the stearic acid to produce the desired insoluble soap film. It is evident that instead of hard water, one could use soft or distilled water and dissolve in it the amount of a metal salt such as zinc chloride or calcium chloride required to react with the stearic acid to form the insoluble soap. As an alternative to treatment of worms in the scrub mill, the comminuted shrub may be treated as it enters the pebble milling circuit. By this means clumping of rubber can be prevented anywhere in the process.

The insoluble soap is effective in the range of 0.1 to 5% based on the estimated dry weight of rubber. We prefer to use approximately 0.5 to 1% soap (calculated as stearic acid) when treating rubber worms in conjunction with scrub milling since we have found that quantities within this range are adequate to give the desired results. However, it is necessary to use more soap (up to 10% based on the dry weight of the rubber) when treating comminuted shrub in the pebble mill as when treating rubber worms in the scrub mill.

The following examples demonstrate the invention in greater detail. These examples are furnished only by way of illustration and not limitation.

The hard water employed in Examples 2, 3, and 4 had the following composition:

| Constituent | Content in parts per million |
|---|---|
| calcium | 4.07 |
| magnesium | 16.0 |
| chloride | 51.5 |
| sulphate | .88 |

*Example 1*

Fifty grams of wet guayule rubber worms as recovered from the secondary flotation were placed in a Waring blender containing 475 ml. distilled water previously heated to 180° F. and containing 0.125 g. stearic acid (present as a melted film on the surface of the water). This amount of stearic acid is equivalent to approximately 0.5% of the dry weight of the rubber. Sufficient calcium chloride (approx. 0.03 g.) to react with all of the stearic acid was added and the whole mixed by the blendor for 3 minutes. The rubber was then removed from the blendor, placed in a beaker with fresh water and allowed to stand several days. The worms remained in a wholly non-adhering condition and exhibited no tendency to clump at any time. In comparision, rubber worms which were treated in the Waring blendor in either distilled or hard tap water alone became badly clumped almost immediately after blendor treatment. This was observed also where either the stearic acid or the calcium chloride was omitted from the treatment.

*Example 2*

Fifty grams of wet guayule rubber worms as recovered from the secondary flotation were mxied for 5 minutes in a Waring blendor with 350 ml. hard water at 90° C. containing 0.25 g. commercial soap powder (Ivory Snow). The worms after treatment showed no evidence of clumping after standing several days.

*Example 3*

Fifty grams of wet guayule rubber worms as recovered from the secondary flotation were mixed for 3 minutes in a Waring blendor with 475 ml. of hard water at 90° C. containing 0.125 g. stearic acid. The worms showed no evidence of clumping after standing several days.

*Example 4*

Fifty pounds of wet rubber worms were scrub milled in a pilot plant size batch pebble mill for 30 minutes at 70° C., using hard water containing 0.5 pound added stearic acid. The weight ratio of water to dry weight of rubber was 20:1. After discharging into a flotation tank and skimming, the worms were allowed to stand in water in a large kettle for a day. The worms remained nonadhering and granular and showed no tendency whatever to cohere or clump. A control scrub milling conducted at the same time was badly clumped. Both the stearic acid treated rubber and the control rubber were deresinated with the use of several changes of acetone in a large kettle fitted with an air-driven stirrer. No difficulty was encountered in deresinating the worms having the insoluble soap film whereas considerable difficulty was found in stirring the control because of clumping of the worms in the latter. Approximately 15% of the control batch had to be discarded at the end of the extraction because of lumps which are incompletely extracted. The stearic acid treated batch yielded 29 pounds of deresinated rubber having a residual resin content of 2.80% (hot ethanol extract) and a Mooney viscosity of 91.5. The control after discarding lumps yielded 25 pounds of deresinated rubber having a residual resin content of 1.92% and a Mooney viscosity of 93. The slight difference in residual resin (as measured analytically by hot ethanol extraction) and in Mooney viscosity between the two batches does not indicate any known quality difference caused by the stearic acid treatment.

*Example 5*

A 250 g. sample of comminuted guayule shrub (moisture approx. 40%) which has been crushed twice through laboratory crushing rolls was placed in a laboratory "attritor." The attritor is a type of pebble mill in which a vertical shaft with horizontal members rotates through a mass of small pebbles while the mill shell remains stationary. A dispersion of 2.2 g. of zinc stearate prepared with the aid of 0.22 g. of dioctyl sodium sulphosuccinate in 800 ml. of cold tap water was added to the comminuted shrub in the attritor. Small pebbles in the amount of 2700 g. were then placed in the apparatus and the mixture milled for 30 minutes at a rotor speed of 300 R. P. M. The slurry thus formed was subjected to a flotation treatment using a water to rubber ratio of 100:1. The worms were clean and fine in size and showed no tendency to cohere even when pressed together between the fingers. A control milling carried out with the same shrub in the same manner but without the zinc stearate produced worms which were not as fine and which could not be separated after pressing between the fingers. The stearate treated worms were demonstrated to be readily deresinated with acetone yielding a rubber of lighter color than the control.

Having thus described our invention, we claim:

1. A process of preparing deresinated guayule rubber which comprises subjecting guayule to aqueous milling operations to form and purify the guayule rubber worms, at least one of the milling operations being in the presence of a water-insoluble metallic soap to coat the worms with the water-insoluble metallic soap, and extracting the coated worms with an organic solvent to deresinate the worms, the water-insoluble metallic soap-coating preventing agglomeration of the worms without interference with the penetration of solvent.

2. In the process wherein resinous guayule worms are subjected to solvent extraction to deresinate the worms, the improvement which comprises coating the worms with a water-insoluble metallic soap prior to the extraction whereby to prevent agglomeration of the worms without interference with the penetration of the solvent.

3. In the process wherein resinous guayule worms are subjected to solvent extraction to deresinate the worms, the improvement which comprises agitating the worms, prior to the extraction, in an aqueous medium containing a dispersion of a water-insoluble metallic soap whereby to coat the worms with the water-insoluble metallic soap thus to prevent agglomeration of the worms without interference with the penetration of the solvent.

4. The process of claim 3 wherein the aqueous medium additionally contains a dispersing agent.

FREDERICK E. CLARK.
IRVIN C. FEUSTEL.

References Cited in the file of this patent

UNITED STATES PATENTS

| Number | Name | Date |
|---|---|---|
| 2,019,055 | Noble | Oct. 29, 1935 |
| 2,035,437 | Stam | Mar. 24, 1936 |
| 2,434,412 | Jones | Jan. 13, 1948 |